United States Patent
Kallesøe (10) Patent No.: US 10,480,968 B2
(45) Date of Patent: Nov. 19, 2019

(54) PUMP SYSTEM AND METHOD FOR DETERMINING THE FLOW IN A PUMP SYSTEM

(71) Applicant: GRUNDFOS HOLDING A/S, Bjerringbro (DK)

(72) Inventor: Carsten Skovmose Kallesøe, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 359 days.

(21) Appl. No.: 15/392,289

(22) Filed: Dec. 28, 2016

(65) Prior Publication Data

US 2017/0184429 A1    Jun. 29, 2017

(30) Foreign Application Priority Data

Dec. 29, 2015   (EP) .................................. 15202953

(51) Int. Cl.
| | |
|---|---|
| G01F 1/34 | (2006.01) |
| E03F 5/10 | (2006.01) |
| F04D 13/06 | (2006.01) |
| F04D 13/16 | (2006.01) |
| F04D 15/00 | (2006.01) |

(52) U.S. Cl.
CPC .................. *G01F 1/34* (2013.01); *E03F 5/105* (2013.01); *F04D 13/06* (2013.01); *F04D 13/16* (2013.01); *F04D 15/0088* (2013.01); *E03F 2201/20* (2013.01)

(58) Field of Classification Search
CPC ........ E03F 5/105; E03F 2201/20; G01F 1/34; F04D 13/06; F04D 13/16; F04D 15/0088

USPC ............................................ 703/7, 9; 702/47
See application file for complete search history.

(56) References Cited

U.S. PATENT DOCUMENTS

| | | | | |
|---|---|---|---|---|
| 5,831,174 | A | * | 11/1998 | Beaudoin ............... F04B 49/025 73/861 |
| 2007/0065304 | A1 | * | 3/2007 | Meloche ............. F04B 11/0075 417/395 |
| 2012/0136590 | A1 | * | 5/2012 | Skovmose Kallesoe .................... F04D 15/0088 702/47 |
| 2012/0324865 | A1 | * | 12/2012 | Habumuremyi ........ F01N 3/208 60/274 |
| 2014/0255216 | A1 | | 9/2014 | Kallesoe et al. |

FOREIGN PATENT DOCUMENTS

| | | |
|---|---|---|
| EP | 2 258 949 A1 | 12/2010 |
| GB | 2 221 073 A | 1/1990 |

* cited by examiner

*Primary Examiner* — Eunhee Kim
(74) *Attorney, Agent, or Firm* — McGlew and Tuttle, P.C.

(57) ABSTRACT

A pump system has at least one fluid container (2) which comprises an inlet (4) and an outlet (6), at least one pump (8) arranged in the inlet (4) or the outlet (6), and a control device (16) which includes a flow evaluation device for determining a flow through the fluid container (2) of the pump system. The flow evaluation device is configured such that the flow evaluation device uses a system model for determining the flow. The system model includes at least two different sub-models, a sub-model which describes the inflow behavior of the fluid container (2) and a sub-model which describes the outflow behavior of the fluid container (2). A corresponding pump flow evaluation method is provided.

17 Claims, 5 Drawing Sheets

PUMP SYSTEM AND METHOD FOR DETERMINING THE FLOW IN A PUMP SYSTEM

CROSS REFERENCE TO RELATED APPLICATIONS

This application claims the benefit of priority under 35 U.S.C. § 119 of European Application 15 202 953.4 filed Dec. 29, 2015, the entire contents of which are incorporated herein by reference.

FIELD OF THE INVENTION

The invention relates to a pump system as well as to a method for determining the flow in a pump system.

BACKGROUND OF THE INVENTION

Pump systems which comprise a fluid container for storing the fluid to be pumped out or the pumped in fluid are known. The fluid level fluctuates in such fluid containers. It is difficult to determine the actual throughflow or exit flow for this reason, since the delivery flow of the pump does not always correspond the throughflow.

GB 2 221 073 discloses a method which is based on time measurements on filling and emptying a fluid tank. This method has the dis-advantage that it only functions when the inflow into the fluid container is essentially constant during the pumping. As a rule, this is not the case.

EP 2 258 949 discloses a method for estimating the flow (throughflow) in a pump system with a fluid container, said method applying a routine for calibration, which is based on the assumption that the inflow into the container is essentially constant during the pumping. Thereby, an average value before switching on the pump forms a basis for the inflow. This method however is also not reliable, in particular if several pumps with several fluid containers are connected in series.

SUMMARY OF THE INVENTION

It is an object of the invention, to improve a pump system with at least one fluid container, to the extent that the flow through the fluid container, I.e. the inlet flow and the exit flow can be determined in a precise manner.

This object is achieved by a pump system with the features according to the invention, as well as by a pump flow evaluation method with the features according to the invention.

The pump system according to the invention comprises at least one fluid container with an inlet and with an outlet. The fluid to be de-livered flows through the inlet into the fluid container and out of this again through the outlet. Moreover, the pump system comprises at least one pump which can be arranged in the inlet or the outlet. This means that the fluid container can be arranged upstream or down-stream of the pump in the flow direction. In waste-water systems for example, it is known for the waste-water to be delivered to firstly flow into a pump sump representing the fluid container, and being delivered out of this with the help of the pump, out of the outlet. In contrast, in water supply systems, it is known for example for the pump to deliver the water into a fluid container which is situated at a higher level. This means that the pump delivers the fluid through the inlet into the fluid container. The fluid can flow away out of the fluid container again, due to gravity for example. With both embodiment variants, it is alternatively and/or additionally possible to arrange several fluid containers with associated pumps in series, so that the fluid is always delivered out of a first fluid container into a subsequent, second fluid container. This can be applied in order to be able to bridge larger delivery heads.

The pump system according to the invention moreover comprises a control device having a flow evaluation device configured to determine or identify the parameters of a flow model describing the flow through the container of the pump system, i.e. the inlet and the exit flow, and to do continuously flow estimation based on the identified parameters of the flow model.

According to the invention, one envisages determining or estimating the flow with the help of the flow evaluation device. The flow evaluation device for this, according to the invention, is configured in a manner such that a system model is applied for determining the parameters of the flow model. Thereby, what is essential to the invention is that the system model which simulates the complete pump system with the fluid container consists of at least two sub-models. A first of the sub-models describes the inflow behavior of the container and a second sub-model describes the outflow behavior of the container, i.e. the outward flow through the outlet. The exit-side flow or exit flow can be determined or estimated via the second sub-model. The sub-models are configured such that they can determine or output the desired flow values continuously on the basis of previously determined model parameters and input variables measured in the system.

The application of two such sub-models has the advantage that a flow evaluation, which is to say a flow model identification, for the exit flow is also possible even if the flow in the inlet is not constant, since the inflow behavior is also simulated in a sub-model. In the reverse case too, when the pump delivers fluid into the fluid container, an outflow out of the fluid container and which is not constant in this case can also be simulated by a suitable sub-model by way of the two sub-models. This means that the inflow behavior and also the outflow behavior are always taken into account in the system model applied according to the invention, so that fluctuations in the inflow and in the outflow have no influence or only a lesser influence on determining the flow model parameters.

The two different sub-models are preferably of a different or varying nature. This means that they are preferably independent of one another and have a different behavior as a reaction to the input parameters. Thus for example the one sub-model is not in the position of assuming the behavior of the other sub-model or being dependent on the behavior of the second sub-model. An independent description of the inflow behavior and of the outflow behavior out of the container can be achieved in this manner.

Further preferably, the control device comprises a memory (memory unit), which is configured to store measurement values (readings) or data, which are/is detected in the pump system. The control device moreover preferably comprises a parameter evaluation device which is configured to determine parameters or model parameters of the at least two sub-models on the basis of the stored data. This means that the models are adapted on the basis of the measured and stored data by way of determining their parameters, so that they describe the system or part-system as accurately as possible.

The parameter evaluation device is preferably configured in a manner such that the parameters of the first sub-model and the parameters of the second sub-model can be simultaneously determined. Further preferably, the parameter evaluation by way of the parameter evaluation device can be effected simultaneously with the flow estimation in the flow evaluation device. This means that the control device permits a continuous evaluation of the flow with a simultaneous continuous adaptation or optimisation of the sub-models, on the basis of which the flow model parameter evaluation (identification) is effected. The parameter evaluation device determines the model parameters on a cyclic base, e.g. a set of data is collected and used for determining a new set of model parameters. The flow evaluation device uses a former set of model parameter for continuously estimating the flow, when a new set of data is collected, the parameter evaluation device determines a new set of model parameters, The parameter evaluation device is configured such that the parameters for both part models are always evaluated, even if later only one of the sub-models is used for determining the flow. Thus the sub-model which describes the outflow behavior is preferably used for determining the flow. The other sub-model then serves as an auxiliary model which merely serves for the parameter evaluation of both sub-models.

The parameter evaluation device is further preferably configured such that the parameters of the at least two sub-models are deter-mined by error minimization between an estimated output variable which is determined by the sub-models, and a corresponding output variable which has been measured or calculated from measurements done in the system. This in particular can be effected by way of applying the least-mean-squares method. This means that the estimated output variable which is determined by the models is compared to actual output variable, and the parameters of the sub-models are adapted such that the estimated variable differs as little as possible from the actual output variable. The sub-models are therefore adapted such that they describe the system as optimally as possible.

The described error minimization can be effected simultaneously for both sub-models, for example by way of a sum or a difference of the two sub-models being formed and being compared to an actual output variable. The actual output variable can thereby correspond to the fluid level or the height of the fluid in the fluid container or its change over time. The change must thereby correspond to the difference between the inflow and the outflow out of the fluid container, and this can be determined from the two sub-models.

According to a preferred embodiment of the invention, the fluid container is provided with a level sensor which detects the fluid level in the inside of the container, wherein the detected fluid level is stored as part of the acquired data, i.e. is stored in the previously described memory means. The stored fluid level, i.e. in particular the temporal course of the fluid level can then serve as a basis for determining the parameters of the sub-models, in the parameter evaluation device. The level or fluid level can thereby be determined in a direct or indirect manner, for example by way of a pressure sensor which determines the hydrostatic pressure.

According to a further preferred embodiment, the at least one pump comprises an electrical drive motor and a power detection device, which detects the current (prevailing) electrical power of the drive motor, wherein the electric power is stored as part of the detected data, i.e. is stored in the previously described memory means. This permits the parameter evaluation device to be able to access the stored power values, in order to determine the parameters of the sub-models. The detected electrical power over time is thus preferably stored in the memory means, since the power detection is preferably detected in a continuous manner.

A pressure sensor is further preferably arranged at the outlet side of the pump and detects the outlet pressure of the pump, wherein the outlet pressure is stored as part of the acquired data, i.e. is stored in the previously described memory means. The parameter evaluation device can thus fall back on stored pressure values, in order to determine the parameters of the sub-models. The pressure sensor preferably detects the pressure in a continuous manner and a temporal course of the outlet pressure is stored in the memory means.

According to a further preferred embodiment, the control de-vice is configured in a manner such that it detects the number of active pumps in the pump system and/or the rotation speed of the at least one pump, wherein preferably the number of active pumps and/or the rotation speed is stored as a part of the acquired, which is to say detected data, i.e. is stored in the previously described memory means or the described memory device. The parameter evaluation device can thus fall back on the number of active pumps or the rotation speed, in order to determine the parameters of the sub-models. Here too, a temporal course of the number of active pumps and/or of the rotation speed can preferably be stored in the memory means or the memory device.

According to a preferred embodiment of the invention, the first sub-model is a function of time and of at least one determined model parameter. The model parameter is determined in the described manner by way of the parameter evaluation device.

The second sub-model is preferably a function of a data which is detected in the system, e.g. of the data to be stored and of at least one determined model parameter. Thereby, it is the case of model parameters which are determined by the previously described parameter evaluation device which is to say are preferably continuously adapted. With regard to the data, it can be the case for example of the output variable corresponding to the fluid level, the electrical power of the drive motor, the exit pressure of the pump, the number of active pumps in the pump system and/or the rotation speed of one or more pumps, as previously described. If the first sub-model is a function of time and the second sub-model is a function of the measured data, then the outputs estimated by these two sub-models are different with regard to their nature and independent of one another, as has been described above as a preferred design.

The control device is further preferably configured such that the second sub-model is applied in order to determine the pump flow or the flow through the fluid container. The second part model, as de-scribed above, is the part model which preferably describes the out-flow behavior of the container. This is particularly the case if the pump is arranged in the outlet of the fluid container. In this case, the first sub-model preferably describes the inflow behavior into the fluid container. If conversely, the pump is arranged in the inlet or intake of the fluid container, then the second sub-model which describes the pump flow describes or represents the inflow behavior into the fluid container, whereas the first sub-model describes or represents the outflow behavior. In the case in which the pump is arranged in the inlet of the fluid container, the flow through the fluid container preferably represents the flow in the outlet of the fluid container, so that in this case the first sub-model can then be used for determining the flow through the fluid container. The control device is accordingly adapted in these cases.

According to a first preferred embodiment of the invention, the fluid container is a pump sump and the pump is arranged in an outlet, in order to pump fluid out of the pump sump, wherein the first sub-model describes the inflow into the pump sump and the second sub-model the behavior of the pump, i.e. the outflow behavior of the fluid container. With regard to the pump, it can preferably be the case of submersible pump, which is immersed into the pump sump. With this design, as described beforehand, the second sub-model is preferably used in order to determine the flow or the hydraulic delivery flow of the pump via the model. The continuous calibration of the sub-models by way of adapting their parameters by way of the parameter evaluation device is advantageous with such a pump system, since with waste-water pumps for example, the efficiency of the pump can rapidly change over time due to contamination and wear. The flow evaluation device according to the invention has the advantage that it continuously calibrates itself, wherein fluctuating inlet flows are also taken into account via the first sub-model.

According to an alternative embodiment, the pump can be arranged in the inlet, in order to fill the container, wherein the first sub-model describes the outflow out of the container and the second sub-model describes the behavior of the pump, i.e. the inflow behavior. With such an embodiment, the first sub-model can be used to determine the exit flow or the flow through the fluid container. Such an arrangement for example can be applied with the supply of water, with which water is pumped via the pump into a fluid container which is situated at a higher location, from which it can flow out again solely on account of gravity. In such a system too, a change of the system characteristics due to wear or contamination can be taken into account by way of continuous calibration or adaptation of the parameters of the sub-models.

The subject-matter of the invention, apart from the previously described pump system, is a pump flow evaluation method, which can be applied for example in the previously described pump system. The pump flow evaluation method serves for determining the flow which is to say the outlet flow of a pump system, wherein the pump system comprises at least one pump and a fluid container. The pump system can preferably correspond to the pump system according to the preceding description. The method is characterized in that the outlet flow is determined by a system model which consists of at least two sub-models, a sub-model which describes the inflow behavior of the fluid container and a sub-model which describes the outflow behavior or the outlet flow of the fluid container. The evaluation of the flow is thereby effected in a manner as has been described beforehand by way of the pump system. The features which are described by way of the pump system thereby likewise represent preferred features of the pump flow evaluation method according to the invention. The preceding description is referred to inasmuch as this is concerned.

The pump flow evaluation method in the system model preferably applies as least two sub-models which are of a different nature to the extent that they have a different behavior as a reaction to a change of input values. Thus the two sub-models, as has been de-scribed above by way of the pump system, do not influence one an-other, and it is possible to continuously adapt the parameters of the system model in a manner such that the system model describes the inflow behavior as well as the outflow behavior out of the fluid container. When the model parameters have been identified the second sub-model is used continuously for a flow estimation. e.g.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
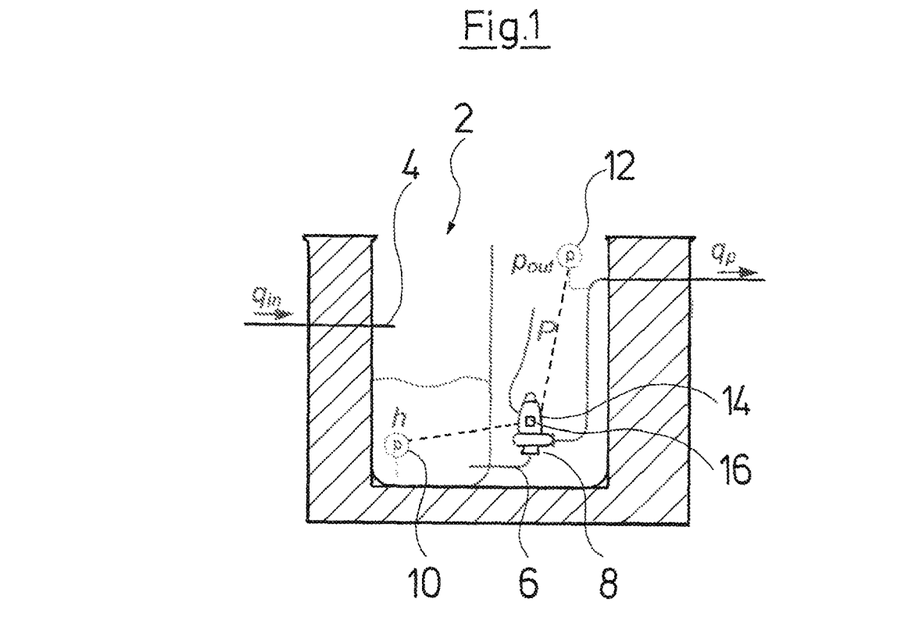
FIG. 1 is a schematic view showing a pump system according to the invention, in the form of a pump sump with a pump which is arranged therein.

According to a first possible embodiment of the invention, the pump system according to the invention can be configured as a system for delivering waste water. FIG. 1 shows a corresponding arrangement. A pump sump 2 forms a fluid container, which is provided with an inlet 4 and with an outlet 6. The inlet 4 is situated on the upper side and the outlet 6 on the lower side of the pump sump 2. A pump 8 which delivers water or liquid out of the pump sump 2 is arranged on the outlet 6. In this example, the pump 8 is arranged outside the pump sump 2. A submersible pump however could also be applied. There are several relevant variables in such a pump system, specifically the inlet flow $q_{in}$ and the outlet flow $q_p$, wherein the outlet flow $q_p$ corresponds to the delivery flow of the pump 8. Two pressure sensors 10 and 12 are provided in the system. The first pressure sensor 10 forms a level sensor. The pressure sensor 10 is arranged in the inside of the pump sump 2, for detecting the hydrostatic pressure at the base of the pump stump 2. The level h of the fluid in the inside of the pump sump 2 can be determined from the hydrostatic pressure in the known manner. The pressure sensor 12 is arranged in the outlet 6 or the outlet conduit downstream of the pump 8, i.e. on the delivery side of the pump 8 and detects the outlet pressure $p_{out}$ of the pump 8. A further variable which is relevant to the system is the electrical power consumption P of the electrical drive motor 14 of the pump 8. The pump 8 preferably comprises n integrated control device 16 which receives sensor signals from the pressure sensors 10 and 12 and also detects the electric power consumption P of the drive motor 14. The control device 16 can additionally control the electric drive motor 14 of the pump 8. The control device 16 moreover comprises a flow evaluation device and by way of this is in the position of determining the flows $q_{in}$ and $q_p$. Alternatively this control device 16 can be an external device especially if there are two or more pumps in the system.

Figure 2:
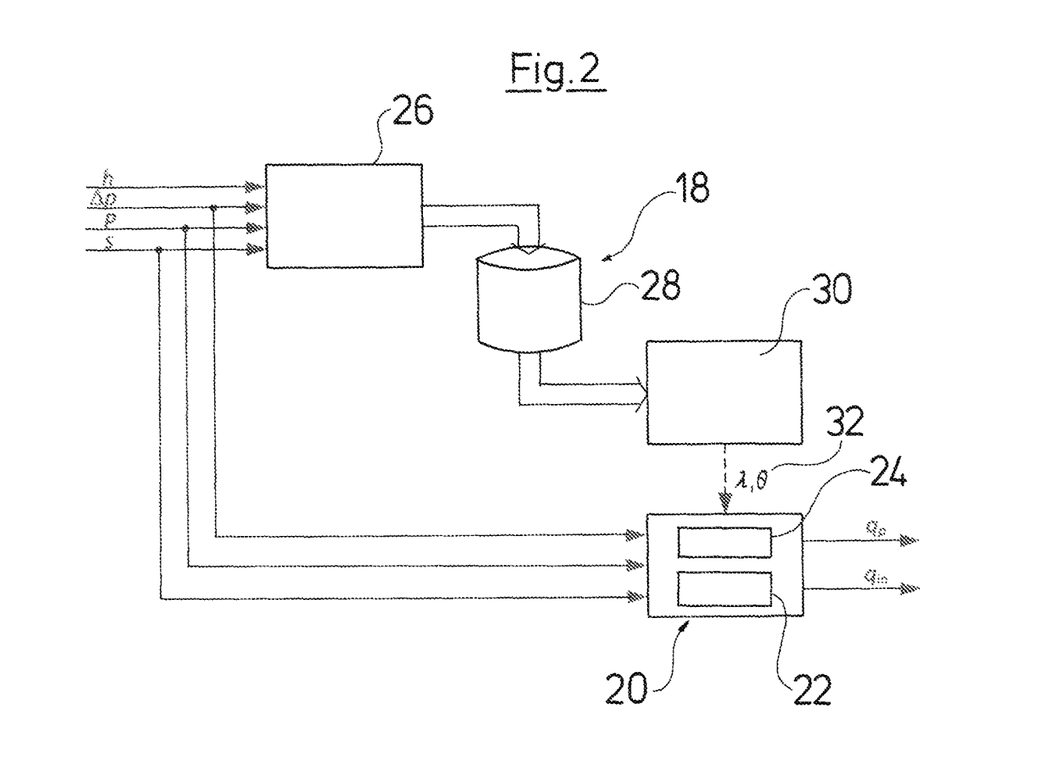
FIG. 2 is a schematic view showing a flow evaluation device according to the invention.

This flow evaluation device 18 is represented schematically in FIG. 2. The flow evaluation device uses a system model 20 simulating the pump system, for the computation or for the approximate evaluation of the flows $q_p$ and $q_{in}$. The system model 20 consists of two sub-models 22 and 24, whose function is described in more detail further below. The flow evaluation device 18 further comprises a data acquisition module 26 which continuously acquires or detects measured system parameters, in this example the height h of the fluid level in the pump sump 2 which is computed on the basis of the signal of the pressure sensor 10 in the control device 16, the differential pressure Δp across the pump 8, i.e. the pressure difference between the pressure sensors 10 and 12, the electrical power consumption P as well as a switching signal s which indicates as to whether the electrical drive motor 14 is switched on or off. This data which is continuously detected by the data acquisition module 26 is continuously stored in a memory means in the form of a data memory 28. Thereby, the newer data can regularly overwrite older data. A parameter evaluation device 30 which is likewise part of the flow evaluation device, in the manner described below determines the model parameters or parameters 32 for the sub-models 22 and 24, on the basis of the data stored in the data memory 28. On the basis of the sub-models 22 and 24 formed in such a manner, these determine the flows $q_p$ and $q_{in}$ on the basis of supplied, current data measured in the system.

The use of the system model 20 for determining the flow through the pump system which corresponds to the outlet flow $q_p$ of the pump 8, avoids having to measure the flow in a direct manner. The efficiency of the pump changes relatively rapidly since the pump 8 is subjected to a wear and a contamination, so that a flow evaluation is not possible based solely on the electrical variables of the drive motor 14 and the measured pressures. A change of the level h over time t is also not a reliable variable for the outlet flow $q_p$, if the inlet flow $q_{in}$ simultaneously changes. This is explained by way of FIGS. 3 and 4.

Figure 3:
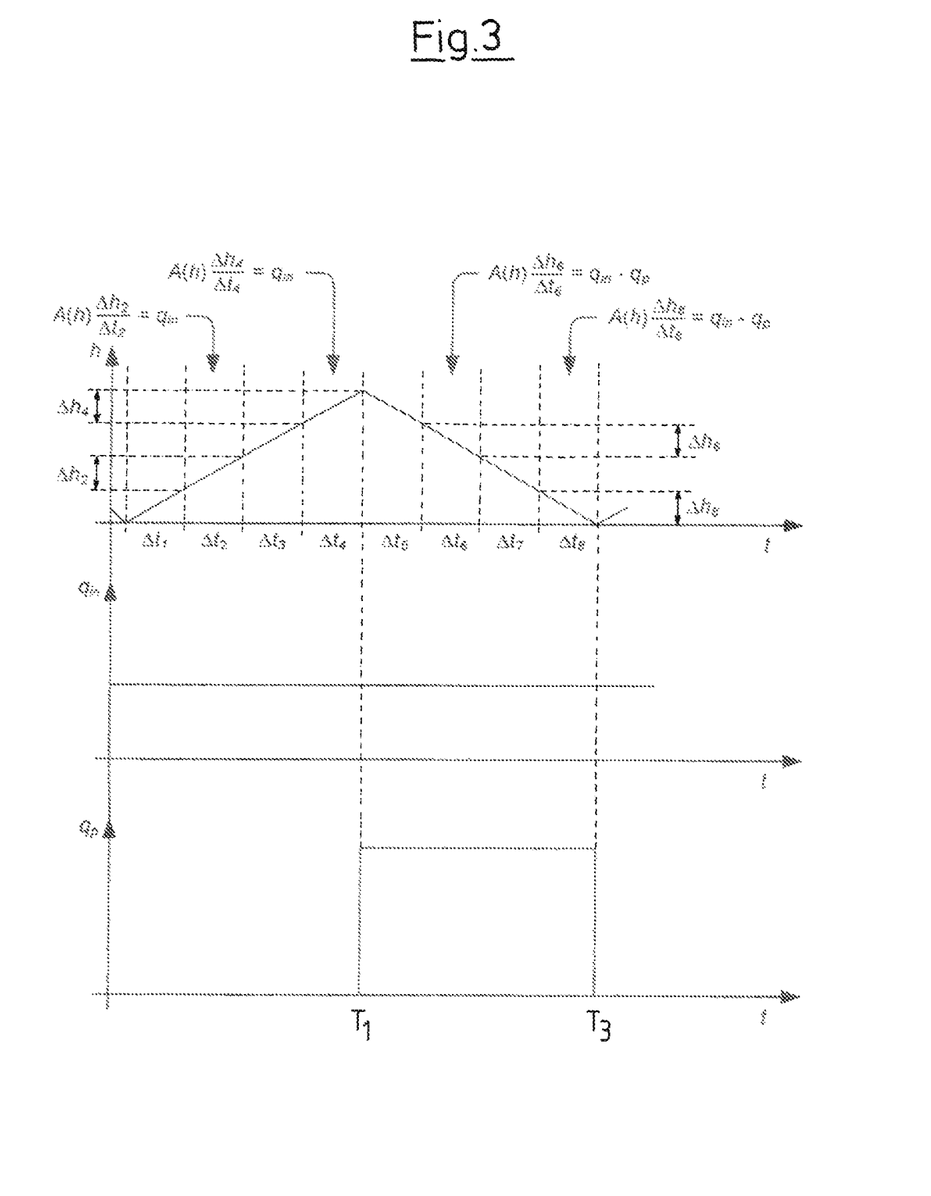
FIG. 3 is a diagram showing the course of the fluid level in dependence on the inlet flow and outlet flow in the pump sump according to FIG. 1.

The behavior of the system over time t is represented in FIG. 3 in three diagrams. The lower curve in FIG. 3 shows the outlet flow $q_p$ over time t. The middle curve shows the inlet flow $q_{in}$ over time t and the upper curve shows the height h of the fluid level in the pump sump 2 over time t. It can be seen that the inlet flow $q_{in}$ is constant. The pump 8 is switched on at the point in time $T_1$ and is switched off again at the point in time $T_3$. The level h rises up to the point in time $T_1$ due to the constant inlet flow $q_{in}$. The inlet flow $q_{in}$ in this time interval is proportional to the increase of the level h. The level h drops again on switching on the pump 8 at the point in time $T_1$, wherein, as is represented in the equations in FIG. 3, the change of the level h over time t is proportional to the difference of the inlet flow $q_{in}$ and the outlet flow $q_p$. If the inlet flow $q_{in}$ is constant, as is represented in FIG. 3, then the outlet flow $q_p$ can be determined from the difference of the level change in the case of a switched-on and switched-off pump 8, without further ado. This is no longer possible of the inlet flow $q_{in}$ changes, as is represented in FIG. 4.

Figure 4:
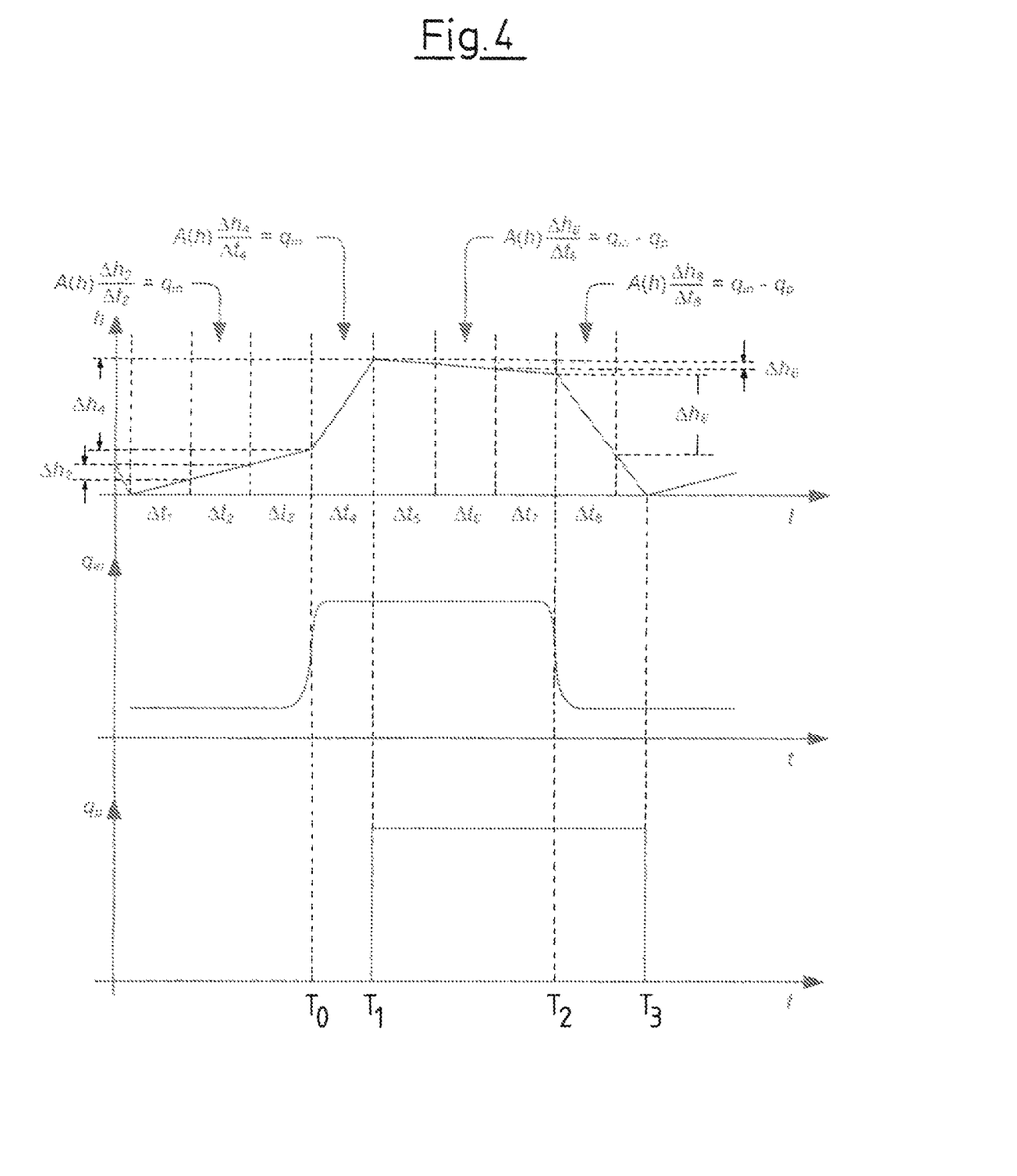
FIG. 4 is a representation according to FIG. 3, but with a fluctuating inlet flow.

The three curves in FIG. 4 correspond to the curves in FIG. 3. In contrast to FIG. 3, the inlet flow $q_{in}$ is not constant in the operating condition according to FIG. 4, but increases at the point in time $T_0$ and reduces at the point in time $T_2$, as is represented in FIG. 4. As can be recognized in the upper curve, the speed at which the level h in the pump sump 2 rises, increases with the increase of the inlet flow $q_{in}$ at the point in time $T_0$ in the interval $\Delta t_4$. Accordingly, the speed of the dropping of the level h is lower in the time intervals $\Delta t_5$, $\Delta t_6$ and $\Delta t_7$ between the points in time $T_1$ and $T_2$, than in the comparable interval in the operating condition according to FIG. 3. The speed at which the level h in the pump sump 2 drops, increases again in the interval $\Delta t_8$, with the reduction of the inlet flow $q_{in}$ at the point in time $T_2$. It is to be recognized that one cannot deduce the outlet flow $q_p$ solely from the speed at which the level h changes, if the inlet flow $q_{in}$ changes, since the temporal change of the level h is always proportional to the difference between the inlet flow $q_{in}$ and the outlet flow $q_p$.

The system model 20 is applied in the manner described hereinafter, in order to be able to determine the outlet flow $q_p$ also in such operating conditions. The system model 20 consists of the two sub-models 22 and 24. What is essential to the system is the fact that the sub-models 22 and 24 are of a different nature. The sub-model 22 describes the inflow behavior, i.e. the inflow $q_{in}$, whereas the sub-model 24 describes or represents the outflow behavior in the form of the outlet flow $q_p$. The first model 22 is thereby dependent on a parameter θ and time t, i.e. $q_{in}$=f (θ t). The second sub-model 24 is of a different nature and is dependent on a parameter λ, the switch-on signal s, the electrical power P and the differential pressure Δp between the pressure sensors 10 and 12, i.e. $q_p$=g(λ, s, P, Δ, p).

The following equation results due to the fact that the inlet flow $q_{in}$ and the outlet flow $q_p$, as represented by way of FIGS. 3 and 4, are dependent on the change of the height h in the pump sump 2:

$$A(h(t)) \frac{h(t + \delta t) - h(t)}{\delta t} = f(\theta, t) - g(\lambda, s(t), P(t), \Delta p(t))$$

In this formula, h corresponds to the level of the fluid level in the pump sump 2, t to the time, δt a time interval and A(h) to the cross-sectional area of the pump sump 2, wherein the cross-sectional area can be a function of the height h, if the pump sump 2 does not have a cross section which is constant over the height. The cross-sectional area A(h) of the pump sump 2 is assumed as being known in the subsequent consideration.

The following model can be applied as a first sub-model 22 representing the feed or inflow behavior:

$$f(\theta,t)=\theta_0+\theta_1 \text{atan}(\theta_2 t+\theta_3)$$

The following model can be applied for example as a second sub-model 24 which represents the outflow behavior:

$$g(\lambda,s,P,\Delta p)=\lambda_0 s+\lambda_1 sP+\lambda_2 s\Delta_p$$

The two sub-models 22 and 24, apart from the different input variables, comprise different model parameters or parameters $\theta_0$, $\theta_1$, $\theta_2$, $\theta_3$ and $\lambda_0$, $\lambda_1$, $\lambda_2$ respectively, which are defined by the parameter evaluation device 30.

It is to be understood that the previously mentioned models are only examples. Differently formed models which are different with regard to their nature can also be applied as a sub-model 22 as well as sub-model 24. Thus for example the sub-model 24 which represents the outflow behavior can also be simplified:

$$g(\lambda,s,P)=\lambda_0 s+\lambda_1 sP$$

Such a model representing the pump 8 is advantageous for example, since the outlet pressure $p_{out}$ is not necessary as an input variable for this. Such a pressure detection is not common in many waste-water installations. Inasmuch as this is concerned, the design of the installation is simplified here. Another simplification of the model could be as follows:

$$g(\lambda, s, \Delta p) = \lambda_0 s + \lambda_1 s \Delta p$$

Such a sub-model 24 representing the outflow behavior or the behavior of the pump 8 has the advantage that no electrical variable of the pump 8 needs to be detected, In contrast, this model is merely based on the model parameters $\lambda_0$ and $\lambda_1$, the switch signal s, the differential pressure $\Delta p$ between the pressure sensors 10 and 12, as well as time t. A more extended version of the sub-model 24 with speed information is:

$$g(\lambda, sP, \Delta p, \omega) = \lambda_0 \frac{s}{\omega} + \lambda_1 \frac{sP}{\omega^2} + \lambda_2 \frac{s\Delta p}{\omega} + \lambda_3 s\omega$$

This version is preferably used if the pump is controlled by a frequency converter as the speed information can be received from the frequency converter.

In a case in which more than one pump is to be arranged in a pump sump 2, which often occurs, there are two different approaches to accordingly represent this by models. On the one hand it is possible to form a model in each case for each pump and to take into account a switch-on, which is to say start/stop signal s for each of the two pumps 8. Two second sub-models 24 would then result in such a case, for example in the form:

$$q_1 = g_1(\lambda_1, s_1, P_1, \Delta p), q_2 = g_2(\lambda_2, s_2, P_2, \Delta p),$$

wherein there are two parameter sets $\lambda_1$ and $\lambda_2$, as well as switch-on signals $S_1$, $S_2$, one for each pump in each case.

On the other hand, it is possible to use a model or sub-model which simulates both pumps, if both pumps or several pumps 8 are simultaneously switched-on, inasmuch as it is the case of pumps 8 of the same type. In this case, the variable s would not be a pure start/stop signal representing the switching-on and switching-off of the pump, but a signal which simultaneously represents how many pumps 8 are simultaneously switched on. In this case the electrical power P would represent the average power of one pump, I. e. the sum of the power from all active pumps divided with the number of active pumps.

The parameters $\lambda$ and $\theta$ of the sub-models 22 and 24 on operation of the pump system are continuously determined and adapted, by the parameter evaluation device 30 on the basis of the previously measured data stored in the data memory 28. The thus adapted parameters 32 ($\lambda$, $\theta$) then form the basis for determining or identifying the inlet flow $q_{in}$ and the outlet flow $q_p$. A continuously running adaptation or optimization of the models is thus effected, so that these sub-models 24 and 24 simulate or represent the system as exactly as possible.

Figure 5:
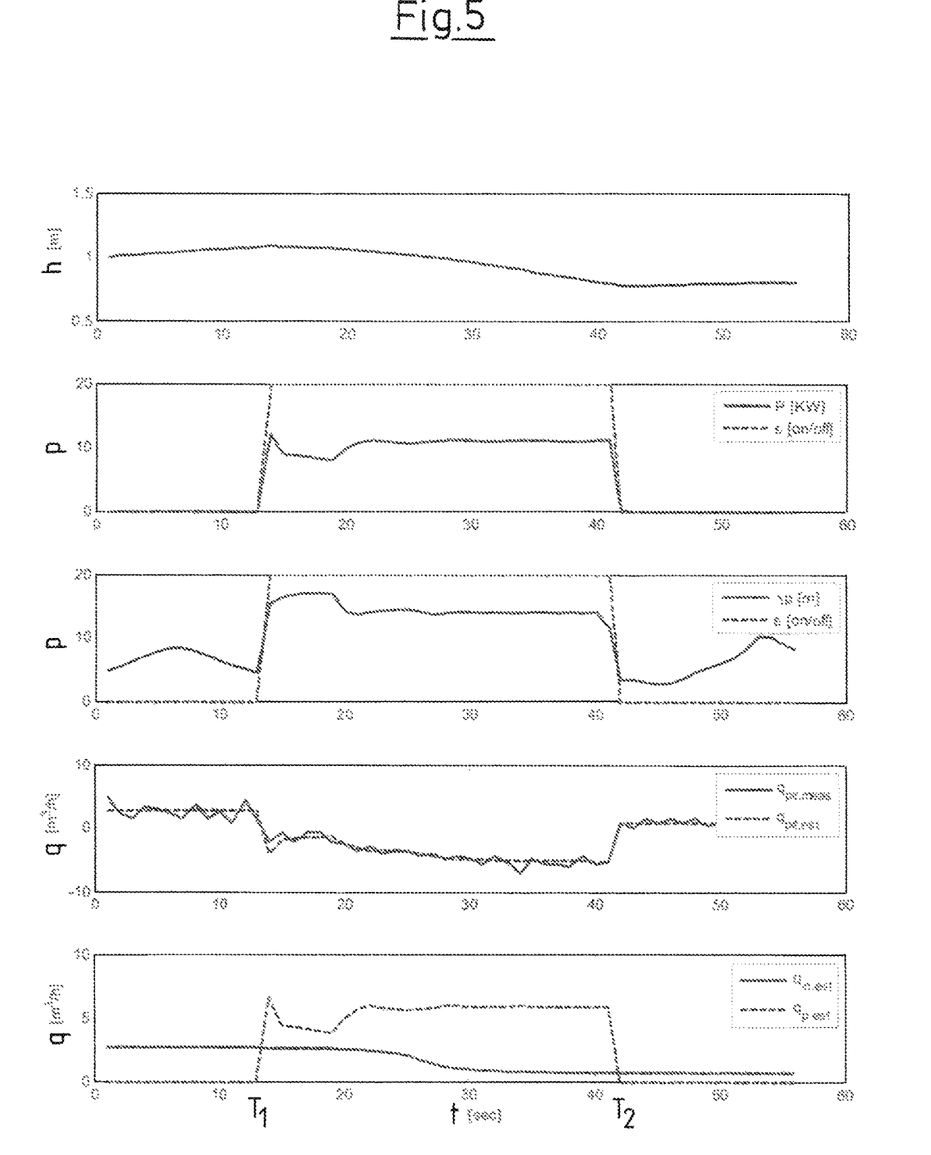
FIG. 5 is a view with several diagrams providing the evaluation of the inlet flow and of the pump flow on the basis of a system model.

The manner of functioning of the models is explained further by way of FIG. 5. The upper curve in FIG. 5 shows the change of the height h over time t. The second curve shows the electrical power consumption P of the drive motor 14 over time t, and the switch signal s which represents the switched-on condition of the drive motor 14. One can recognize that the pump 8 is switched on between the point in time $T_1$ at about 13 seconds and the point in time $T_3$ at about 42 seconds. The third curve in FIG. 5 shows the pressure signal which results therefrom, for the differential pressure $\Delta p$ between the two pressure sensors 10 and 12. The pressure difference $\Delta p$ increases on switching on the pump 8.

The fourth curve in FIG. 5 parallel to this shows the pump sump flow $q_{pit}$, i.e. the flow $q_{pit}$ which leads to the rising and dropping of the level h in the pump sump 2. The pump sump flow $q_{pit}$ is the difference between the inlet flow $q_{in}$ and the outlet flow $q_p$. The actual pump sump flow $q_{pit}$ which results from the measurement of the height h and the known cross section A(h) of the pump sump 2 is represented in the fourth curve in FIG. 5 as an unbroken line. The dashed line shows the estimated pump sump flow $q_{pit,est}$ which is determined on the basis of the sub-models 22 and 24.

The pump sump flow $q_{int,est}$ which is thus determined by the models is based on the inlet flow $q_{in,est}$ and the outlet flow $q_{p,est}$ which are determined by the sub-models 22 and 24 and are represented in the lower curve in FIG. 5. One can recognize that the models represent the actually measured pump sump flow $q_{int}$ in an accurate manner.

The pump sump flow $q_{int}$ results according to the following equation:

$$q_{pit}(t) = A(h(t)) \frac{h(t + \delta t) - h(t)}{\delta t} = q_{in}(t) - q_p(t)$$

The variables used in the equation correspond to the variables which are described above.

The deduction of the parameters $\lambda$ and $\theta$ for the sub-models 22 and 24 can be effected by way of comparing the result variables determined by the models, with actually measured, corresponding variables, for example whilst using the least-mean-squares method. As explained above, the pump sump flow $q_{int}$ can be computed in dependence on the time t according to the previous equation from the level h which is measured in the pump sump 2, i.e. this variable can actually be measured and compared to the pump sump flow $q_{pit,est}$ which is determined on the basis of the models. With regard to the pump sump flow $q_{pit,est}$ which is determined on the basis of the models, it is the case of an estimated pump sump flow which results from the sub-models 22 and 24 which are described above. A method which minimizes the prediction errors is applied. The model parameters $\theta_0$, $\theta_1$, $\theta_2$, $\theta_3$ as well as $\lambda_1$ and $\lambda_2$ are accordingly adapted for this.

The aim of the flow evaluation device 18, with the embodiment example according to FIG. 1 is to determine the outlet flow $q_p$. Actually, only the second sub-model 24 is necessary for this. However, in order to be able to determine its parameter $\lambda$, the first sub-model 22 representing the inlet flow $q_{in}$ is necessary, in order in the described manner to determine the model parameters $\lambda$ and $\theta$ by way of comparing the estimated pump sump flow $q_{pit,est}$ with the measured pump sump flow $q_{pit}$. The sub-model 22 in this case thus forms an auxiliary model which is used for parameter evaluation.

Figure 6:
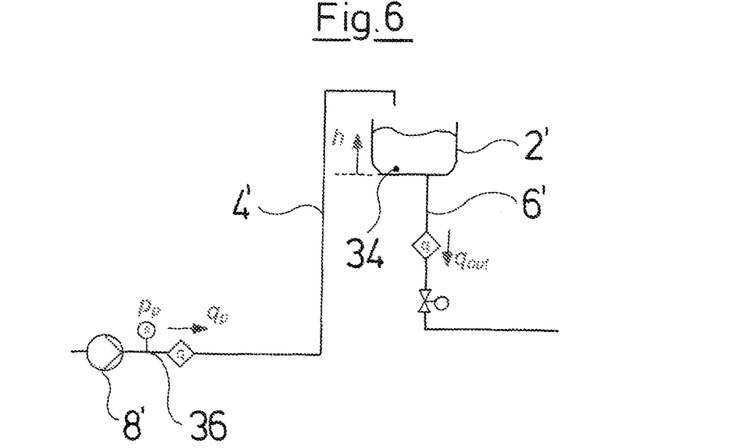
FIG. 6 is a schematic view showing a pump system which is suitable for the supply of water.

FIG. 6 shows a second embodiment example of the invention. The embodiment example shows a pump system for the water supply. A tank 2' is provided here as a fluid container, wherein the pump 8' is arranged in its inlet 4'. The tank 2' lies above the pump 8', so that this pump pumps water or fluid into the tank 2' in an inlet flow $q_p$. The fluid can escape out of the tank 2' via the outlet 6' on account of gravity. An outlet flow $q_{out}$ is therefore formed. A level sensor 34 which for example can likewise be configured as a pressure sensor, as is described by way of FIG. 1, is provided for determining the fluid level or height h in the tank 2'. A pressure sensor 36 which detects the outlet pressure pp of the pump 8' is arranged here at the exit side of the pump 8'. In this case too, a first sub-model 22 which represents the inlet flow, in this case the pump flow $q_p$ and a second sub-model 24 which represents the outlet flow $q_{out}$ can also be applied in the corresponding manner in the control device for determining the flow. Here too, the flow in the tank $q_{pit}$ is dependent on the difference of the flows $q_p$ and $q_{out}$. Inasmuch as this is concerned, the parameter evaluation of the parameters λ and θ for both sub-models 22 and 24 can be effected in a manner which corresponds to that which was previously described. A Fourier series for example can be applied as a model for the outlet flow $q_{out}$ $$q_{out}=f(\theta,t)=\theta_0+\theta_1 \cos(\omega t)+\theta_2 \sin(\omega t)+ \ldots$$

or an approximation polynomial $$q_{out}=f(\theta,t)=\theta_0+\theta_1 t+\theta_2 t^2+ \ldots$$

The pump flow $q_p$ which corresponds to the inlet flow, as in the first embodiment example, can be approximated as a function g (λ, s, P, Δp). Thereby, Δp is the differential pressure across the pump 8' and the switching variable s represents the number of active pumps in the case that several pumps are arranged in parallel, as has been described beforehand.

The differential pressure can be calculated as a delivered pump pressure when the pump is operating subtracted from a system pressure, where the system pressure is evaluated and stored when the pump is stopped e. g. both the delivered pump pressure and the system pressure can be measured with one pressure sensor pp 36.

Figure 7:
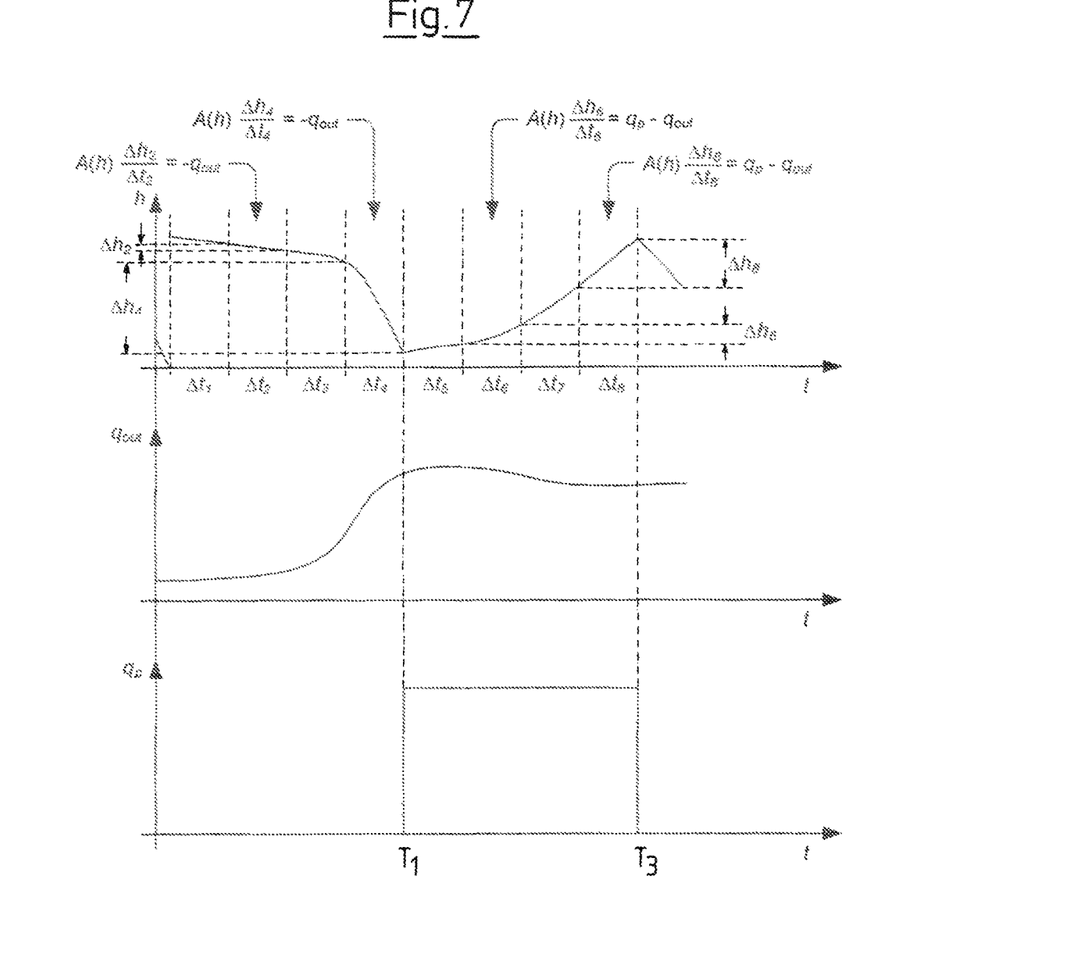
FIG. 7 is a view with diagrams which represent the fluid level in the fluid container according to FIG. 6, in dependence on the inflow and the outflow.

FIG. 7 shows the course of the height h over time and accordingly the change of the outlet flow $q_{out}$ and of the pump flow $q_p$, wherein the pump 8' is switched on at the point in time $T_1$ and is switched off at the point in time $T_3$.

As is schematically represented in FIG. 2, a continuous adaptation of the sub-models 22 and 24 can be simultaneously effected with the flow evaluation also with the second embodiment example according to FIGS. 6 and 7.

While specific embodiments of the invention have been shown and described in detail to illustrate the application of the principles of the invention, it will be understood that the invention may be embodied otherwise without departing from such principles.

APPENDIX

List of Reference Characters

2 pump sump
2' tank
4, 4' inlet
6, 6' outlet
8, 8' pump
10 pressure sensor, level sensor
12 pressure sensor
14 drive motor
16 control device
18 flow evaluation device
20 system model
22, 24 sub-models
26 data acquisition module
28 data memory, memory means
30 parameter evaluation device
32 parameter
34 level sensor
36 pressure sensor
$q_{in}$ inlet flow of the pump sump
$q_{out}$ outlet flow $q_p$ outlet flow of the pump sump, pump flow
$q_{pit}$ pump sump flow, $q_{pit}=q_p-q_{out}$ or $q_{pit}=q_{in}-q_p$
h level
P electric power
$P_{out}$ outlet pressure of the pump
s switch-on signal which represents the number of pumps which are switched on
Δp differential pressure across the pump
t time
Δt δt time intervals
E(θ, t) mathematic model which describes the inflow behavior
θ parameter vector which comprises the parameters of the model for the inflow behavior
$\theta_i$ parameter
g (λ, s, P, Δp) mathematic model which describes the pump flow or the outflow behavior
λ parameter vector which contains the parameters of the model describing the pump flow
λi parameter

What is claimed is:

1. A pump system comprising:
   at least one fluid container comprising an inlet and an outlet;
   at least one pump arranged in the inlet or in the outlet; and
   a control device comprising a flow evaluation device for determining a flow through the fluid container of the pump system, the flow evaluation device being configured such that the evaluation device uses a system model for determining flow, wherein:
   the system model is comprised of at least two different sub-models, comprising a sub-model which describes inflow behavior of the fluid container and a sub-model which describes outflow behavior of the fluid container;
   the control device comprises:
   a memory configured to store data acquired in the pump system, and
   a parameter evaluation device configured to determine parameters of the at least two sub-models on the basis of the stored data; and
   the parameter evaluation device is configured to determine parameters of the first sub-model simultaneously with a determination of parameters of the second sub-model.

2. A pump system according to claim 1, wherein the two different sub-models are of a different nature from each other.

3. A pump system according to claim 1, wherein the parameter evaluation device is configured to determine parameters of the at least two sub-models by way of error minimization between an estimated output variable which is determined by the sub-models, and a corresponding output variable which has been measured or calculated in the system by way of the use of the least-mean-squares method.

4. A pump system according to claim 1, wherein the fluid container is provided with a level sensor which detects the fluid level in the inside of the fluid container, wherein the detected fluid level is stored as part of the acquired data.

5. A pump system according to claim 1, wherein the at least one pump comprises an electrical drive motor and a power detection device which detects the current electrical power of the drive motor, wherein the electric power is stored as part of the acquired data.

6. A pump system according to claim 1, wherein a pressure sensor is arranged at the outlet side of the pump, said pressure sensor detecting the outlet pressure of the pump, wherein the outlet pressure is stored as part of the acquired data.

7. A pump system according to claim 1, wherein the control device is configured such that the control device detects a number of active pumps in the pump system or a rotation speed of the at least one pump, wherein a number of the active pumps or a rotation speed or both a number of the active pumps and a rotation speed is stored as part of the acquired data.

8. A pump system according to claim 1, wherein the first sub-model is a function of time and of at least one determined model parameter.

9. A pump system according to claim 1, wherein the second sub-model is a function of data which is acquired in the system, and of at least at least one determined model parameter.

10. A pump system according to claim 1, wherein the control device is configured such that the second sub-model is used in order to determine pump flow.

11. A pump system according to claim 1, wherein:
the fluid container is a pump sump, and the pump is arranged in an outlet to pump fluid out of the pump sump; and
the first sub-model describes the inflow into the pump sump and the second sub-model describes behavior of the pump.

12. A pump system according to claim 1, wherein:
the pump is arranged in the inlet to fill the fluid container; and
the first sub-model describes outflow out of the fluid container and the second sub-model describes behavior of the pump.

13. A pump flow evaluation method for determining outlet flow of a pump system, the method comprising:
providing the pump system, which pump system comprises at least one pump and a fluid container comprising an inlet and an outlet;
providing a control device comprising a flow evaluation device for determining a flow through the fluid container of the pump system, the flow evaluation device being configured such that the evaluation device uses a system model and a memory configured to store data acquired in the pump system;
acquiring data from the pump system and storing the acquired data in the memory;
with the control device determining outlet flow by the system model which is comprised of at least two sub-models, comprised of a sub-model which describes inflow behavior of the fluid container and of a sub-model which describes outflow behavior of the fluid container;
providing the control device with a parameter evaluation device configured to determine parameters of the sub-models on the basis of the stored data; and with the parameter evaluation device, determining parameters of the first sub-model simultaneously with determining parameters of the second sub-model.

14. A pump flow evaluation method according to claim 13, wherein the at least two sub-models are of a different nature to the extent that they have a different behavior as a reaction to a change of input values.

15. A pump flow evaluation method according to claim 13, wherein during a continuous operation of the pump system the parameter evaluation device continuously determines and adapts parameters of the sub-models by continuously determining parameters of the first sub-model simultaneously with continuously determining parameters of the second sub-model, based on previously measured data stored in the data memory, which is provided with said step of acquiring data from the pump system during said continuous operation of the pump system.

16. A pump system according to claim 1, wherein the parameter evaluation device is configured to, during a continuous operation of the pump system, continuously determine and adapt parameters of the sub-models by continuously determining parameters of the first sub-model simultaneously with continuously determining parameters of the second sub-model, based on previously measured data stored in the data memory, which data is acquired during said continuous operation of the pump system.

17. A pump system comprising:
at least one fluid container comprising an inlet and an outlet;
at least one pump arranged in the inlet or in the outlet; and
a control device comprising a flow evaluation device for determining a flow through the fluid container of the pump system, the flow evaluation device being configured such that the evaluation device uses a system model for determining flow, wherein:
the system model is comprised of at least two different sub-models, comprising a sub-model which describes inflow behavior of the fluid container and a sub-model which describes outflow behavior of the fluid container;
the control device comprises:
a memory configured to store data acquired in the pump system, and
a parameter evaluation device configured to determine parameters of the at least two sub-models on the basis of the stored data;
the parameter evaluation device is configured to continuously determine parameters of the first sub-model and to continuously determine parameters of the second sub-model during a continuous operation of the pump system, based on previously measured data stored in the data memory, which data is from said continuous operation of the pump system; and
the continuous determination of parameters of the first sub-model occurs simultaneously with the continuous determination of parameters of the second sub-model.

* * * * *